Figure 4:
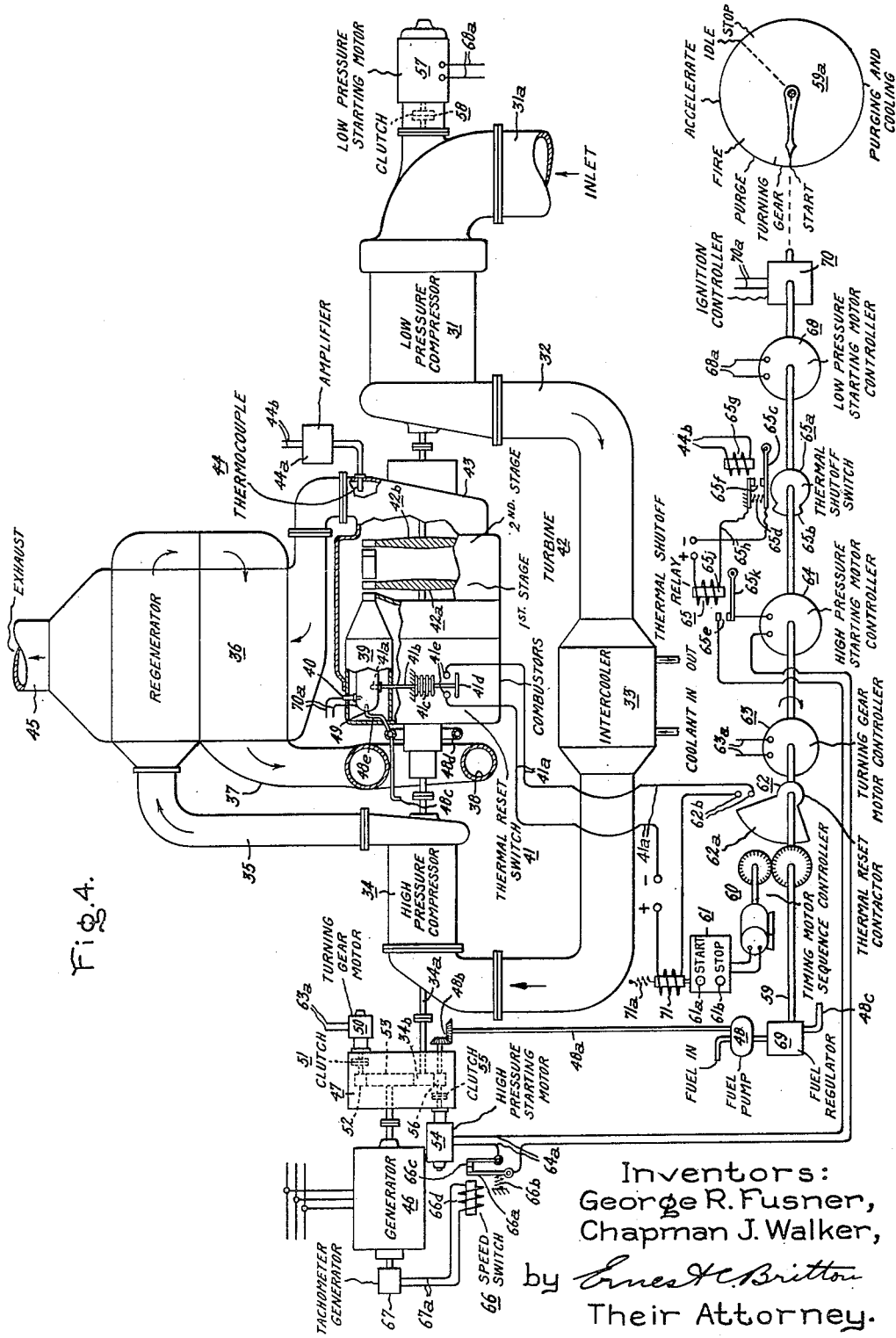

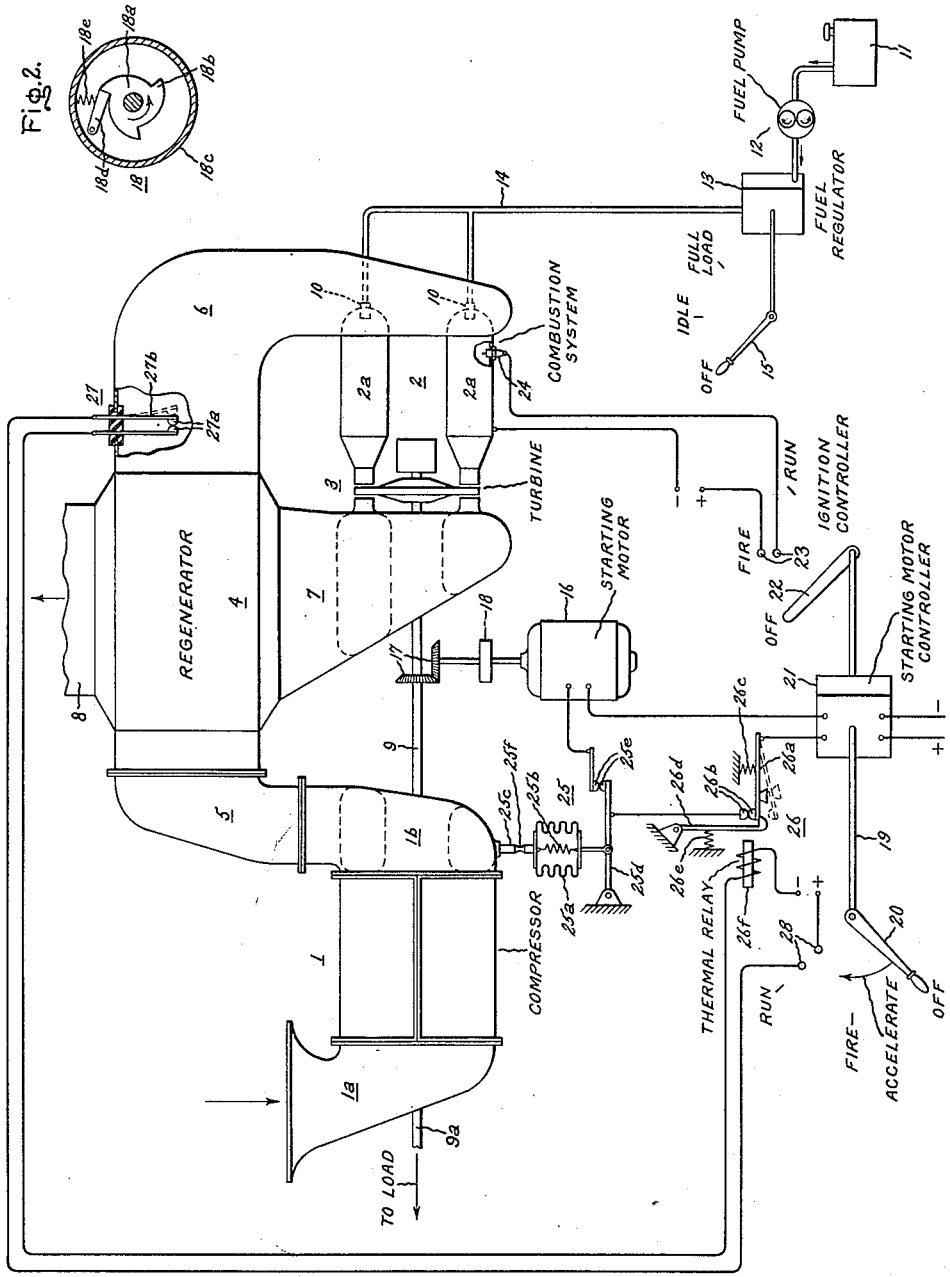

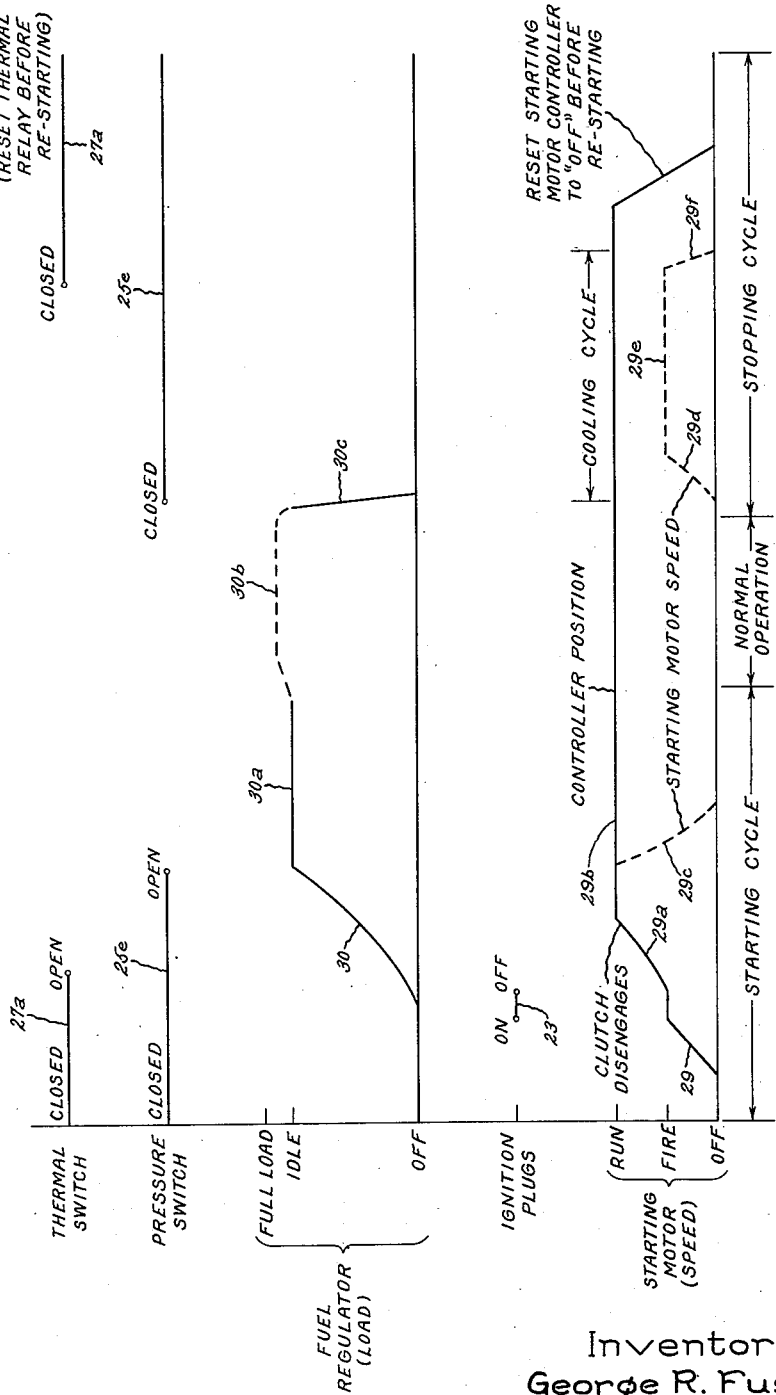

Inventors:
George R. Fusner,
Chapman J. Walker,
by Ernest H. C. Britton
Their Attorney.

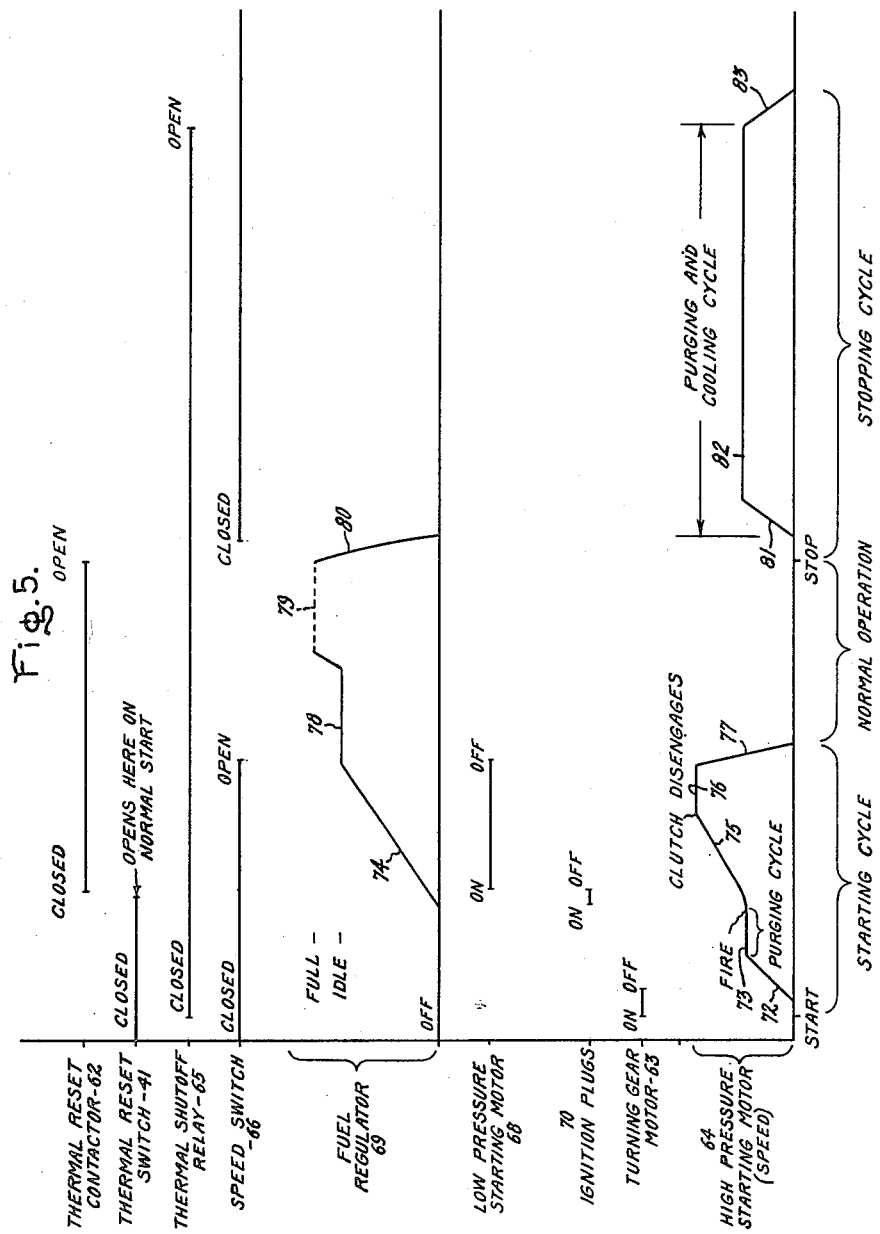

Patented Nov. 11, 1952

2,617,253

UNITED STATES PATENT OFFICE 2,617,253

SAFETY CONTROL SYSTEM FOR COOLING A GAS TURBINE POWER PLANT ON SHUTDOWN

George R. Fusner and Chapman J. Walker, Schenectady, N. Y., assignors to General Electric Company, a corporation of New York Application September 23, 1950, Serial No. 186,354

11 Claims. (Cl. 60—39.09)

This invention relates to a method and apparatus for governing the operation of a gas turbine powerplant, particularly regulating means for the starting and stopping cycles thereof.

This invention was developed specifically in connection with a 5,000 kw. gas turbine powerplant having a plurality of heat exchangers of substantial size and mass for removing heat from the fluid during the compression process, transferring heat from the turbine exhaust gas to the combustion air, etc. A serious problem encountered in the design of such a powerplant results from the very substantial heat storage capacity of the heat exchangers. If special provision is not made for safely disposing of this stored heat, there is a substantial risk that, after shutting down the powerplant, currents of air from the surrounding atmosphere will blow back down the exhaust stack, pick up heat in the heat exchangers, and enter the compressor, which has blades of magnesium or aluminum alloy, or other similar materials not able to withstand the resulting high temperatures. For instance, this blow-back may easily result in gases of a temperature on the order of 800° F. reaching the compressor blades, with extremely serious damage to the blading, warpage of the entire compressor rotor structure, and perhaps damage to the bearings. This stored heat will also have a tendency to warp the turbine and compressor casings, frame structure and bearing supporting members, with the result that excessive deformations may take place in the rotor and frame structure.

Accordingly, the object of the present invention is to provide an improved regulating system for a gas turbine powerplant, specially arranged to remove the heat stored in the heat exchangers and other hot components by turning the compressor rotor for a certain period after shutdown so as to cause comparatively cool air from the atmosphere to circulate through the compressor, then through the heat exchangers, combustion system and other hot components, for such period of time as may be required to "blow out" the stored heat. In a large powerplant of the type described, this may take as long as 6 hours, and during this period the continuous rotation of the turbine-compressor rotors insures that they will cool evenly.

Other objects and advantages will become apparent from the following description taken in connection with the accompanying drawings, in which Fig. 1 is a schematic view of a simple gas turbine powerplant having a single regenerative heat exchanger for transferring waste heat in the exhaust gases to the combustion air, and having a representative regulating system arranged in accordance with the invention; Fig. 2 is a detail view illustrating the type of clutch employed between the starting motor and the gas turbine rotor; Fig. 3 is a diagram representing the sequence of operations during the starting and the stopping and cooling cycles; Fig. 4 is a diagrammatic outline of a more complex gas turbine powerplant having a control system in accordance with the invention; and Fig. 5 is an operating diagram for the powerplant of Fig. 4.

Generally, this invention is practiced by manually or automatically re-energizing the auxiliary starting motor, after the powerplant has been shut down by discontinuing the fuel supply thereto, and causing the powerplant rotor to turn continuously at such a speed and for such a length of time as may be required to circulate air throughout the powerplant so as to carry away the stored heat.

Referring now more particularly to Fig. 1, the gas turbine powerplant, illustrated diagrammatically, comprises a multi-stage compressor, preferably of the axial-flow type, shown at 1, a combustion system indicated at 2, the turbine proper shown at 3, and a heat exchanger 4 arranged as a "regenerator" for transferring heat from the hot gas discharged from turbine 3 to the combustion air as it flows from compressor 1 to combustion system 2. It will be apparent that the axial-flow compressor 1 has an inlet casing 1a and a discharge casing 1b, and is connected to the regenerator by a transition conduit 5. The regenerator in turn communicates by way of conduit 6 with the inlet to the combustion system 2, from which the hot gases pass directly through the turbine wheel. Waste gases from the turbine are exhausted through casing 7 directly through the regenerator 4, thence to the atmosphere through an exhaust pipe 8. As will be appreciated by those familiar with powerplants of this type, the turbine rotor is coupled directly so as to drive the compressor rotor, the common rotor shaft being indicated at 9 in Fig. 1. The useful net power output may be absorbed by any suitable load device, such as an electric generator, pump, or other device (not shown), connected to the end portion 9a of the rotor shaft.

A suitable fluid fuel, for instance natural gas, diesel oil, or the heavier residual oils known to the trade as "Bunker C," are supplied to fuel nozzles 10, there being one nozzle in each of the combustors 2a. Fuel may be drawn from a storage tank 11 by a pump indicated diagrammatically as a positive displacement gear type pump 12, passed through a regulating device indicated at 13, which supplies fuel to nozzles 10 by way of a conduit 14 in accordance with the position of a manual throttle handle 15. For the sake of simplicity, the throttle 15 is shown to have an "off" position, "idle" position, and "full load" position. The precise mechanism by which fuel regulator 13 performs its functions is not necessary to an understanding of the present invention; therefore, it is not disclosed more fully herein. It may be noted, however, that this regulator may take many forms, for instance that disclosed in the copending application of N. E. Starkey, C. B. Lewis, and M. A. Edwards, Serial No. 84,416, filed March 30, 1949, now Patent No. 2,558,592, and assigned to the same assignee as the present application. Likewise the fuel nozzles 10 may be of the type disclosed in the copending application of B. O. Buckland and D. C. Berkey, Serial No. 62,634, filed November 30, 1948, now Patent No. 2,595,759, and also assigned to the same assignee.

For starting the powerplant, a suitable auxiliary starting motor is required to bring the rotor shaft 9 up to the speed required to "fire" the combustion system. This starting motor is indicated at 16 as being an electric motor connected by suitable gears 17 to drive the rotor shaft 9, there being a special clutch 18 interposed between motor and gearing. This clutch is of a general type illustrated in Fig. 2, and its method of operation will be indicated hereinafter.

The regulating means for the electrical components of the powerplant includes an actuating member adapted to be positioned, either manually or automatically by suitable timing devices, in order to effect the starting and stopping method described herein. This main actuating member is illustrated diagrammatically as being a shaft 19 having positioning means represented by the manual handle 20 having "off," "fire," and "run" positions. As indicated in Fig. 1, moving this lever from the "off" position clockwise toward the "run" position causes the starting motor 16 to accelerate the powerplant rotor shaft 9 to a speed at which the compressor will supply air to the combustion system adequate for initiating combustion. The electric controller which performs the various functions required to make motor 16 start and accelerate the rotor 9 in the desired manner is indicated generally at 21, and may be any suitable type of electric motor controlling device, the details of which are not material to an understanding of the present invention.

An extension of shaft 19 is also arranged to actuate control means for the glow plug or spark plug 24 used to effect ignition in the combustors 2a. This is represented by a contact arm 22 adapted to rotate with the shaft 19 so as to bridge the ignition circuit contacts 23 when manual lever 20 is moved to the "fire" position. It will be apparent from Fig. 1 how this arrangement completes the circuit from the source of electrical energy to the spark plug 24. It will also be apparent that when lever 20 moves past the "fire" position into the "run" position, the ignition circuit is de-energized.

The circuit for controlling the starting motor 16 includes two automatic devices, one a pressure responsive switch 25 sensitive to the discharge pressure in the compressor casing 1b, the other a thermal relay 26 actuated by a temperature responsive device indicated diagrammatically as being a bimetallic strip thermostat indicated generally at 27.

The pressure switch 25 may be of any suitable type, but is indicated diagrammatically in Fig. 1 as comprising a flexible bellows 25a biased to collapsed position by an internal tension spring 25b and adapted to be expanded by compressor discharge pressure communicated by a pressure sensing conduit 25c. The movable end of bellows 25 is pivotally connected to a contact lever 25d arranged to open contacts 25e when compressor discharge pressure rises to the normal rated value.

The thermal relay 26 comprises a contact lever 26a adapted to open contacts 26b when biased to the open condition by spring 26c. Lever 26a may be provided with a push-button for manually resetting contacts 26b to the closed condition, in which position lever 26a is retained by a pivoted latch 26d, which is in turn biased toward latched position by a spring 26e and arranged to be retracted by a solenoid 26f when the circuit thereto is completed by the closing of the contacts 27a of the thermostatic device 27. As will be apparent in Fig. 1, and for reasons which will become apparent from the description of the method of operation disclosed below, the circuit from the source of electric energy to the solenoid 26f is not completed except when the manual lever 20 is in the "run" position, in which lever 20 bridges the contacts 28.

The operation of this regulating system will become apparent from the following description, taken in connection with Fig. 3, which is a diagrammatic representation of the starting and stopping cycles. Assume first that the manual lever 20 is in the "off" position, as is also the fuel regulating throttle lever 15. Since the compressor 1 is at rest, the pressure switch 25 will have contacts 25e in closed position. Before attempting to start the powerplant, it is first necessary to reset the thermal relay 26 by means of the manual push-button on lever 26a. By thus causing the lever 26a to move clockwise about its pivot, the cam-shaped end of latch lever 26d causes the latch to rotate clockwise against the bias of spring 26e until contact lever 26a reaches the position where the contacts 26b are closed, whereupon the latch lever 26e snaps to the engaged position shown in Fig. 1, to retain contacts 26b closed until the solenoid 26f is energized.

It will be apparent from Fig. 1 that with the pressure responsive contacts 25e and the thermal relay contacts 26b both closed, the circuit to the starting motor 16 is complete so that the motor controller 21 is free to energize the starting motor as the operating handle 20 is moved away from the "off" position. It will also be observed that the bimetallic strip 27b is in the "cold" position, with the contacts 27a closed. However, the circuit to the solenoid 26f is open at the contacts 28.

If now the motor controller handle 20 is caused to move away from the "off" position in the "accelerate" direction, the controller 21 energizes motor 16 so that the powerplant rotor shaft 9 is driven through the gears 17. This motion of handle 20 and the accompanying increase in starting motor speed is indicated by the curve 29 in Fig. 3. By the time the operating handle 20 reaches the "fire" position, the speed of rotor 9 is such that air is being supplied to the combustion system from compressor 1 at a rate adequate for supporting combustion. The ignition plug 24 is now energized by reason of the contacts 23 being bridged by the ignition controller arm 22; and combustion begins. The fuel regulator handle 15 may now be moved away from its "off" position to the "idle" position. As this is done, the fuel supplied to the nozzles 10 increases, as represented by the curve 30 in Fig. 3. The hot gases resulting from this fuel supplied to the combustion system help to accelerate the gas turbine rotor; and the motor control handle 20 is caused to move progressively to the "run" position.

As soon as handle 20 moves away from the "fire" position, the ignition circuit to the spark plug 24 is de-energized, as will be obvious from Fig. 1. It will likewise be apparent that the temperature of the regenerator will begin to rise, with the result that the bimetallic strip 27b assumes the curved position indicated by dotted lines in Fig. 1, so that the contacts 27a are opened. It will be seen from Fig. 3 that the thermal switch 27 opens, due to the temperature rise in the regenerator 4, before the motor controller handle 20 reaches the "run" position, in which it bridges the contacts 28. Thus the opening of the contacts in the thermal switch 27 prevents energization of solenoid 26f when controller handle 20 moves into the "run" position.

It is to be noted that the electric starting motor 16 is of a type and capacity such that it is not capable of turning the powerplant rotor at the full normal rated speed of the powerplant. For instance, the normal rated speed of rotor shaft 9 may be on the order of 6700 R. P. M., while the starter motor 16 is designed to bring the rotor up only to a speed on the order of 4000 R. P. M. This maximum speed condition of the starting motor, when no fuel is being injected, is indicated by the curve 29e in Fig. 3, and the further increase in speed of the starting motor accompanying the motion of the operating handle 20 from the "fire" to the "run" position, fuel being supplied by regulator 13, is indicated by the curve 29a.

Reference must now be made to the nature of the clutch 18. This is of the centrifugally operated "sprag" type indicated diagrammatically in Fig. 2. It will be appreciated by those familiar with the power transmission art that this type of clutch comprises a driving member in the form of a rotor 18a having a plurality of cams or ratchet teeth 18b, the driving rotor 18a being fixed to the shaft of motor 16. The driven member 18c is a disk carrying a plurality of pivoted pawls, only one of which is shown at 18d. This pawl is pivoted at its outer end and biased inwardly by a suitable spring 18e so as to engage ratchet tooth 18b. It will be understood that when the driving rotor 18a rotates counterclockwise, the ratchet teeth 18b engage the end portions of pawls 18d so that the disk 18c is positively driven. As the speed of the driven member increases, centrifugal force tends to throw the pawls 18d outwardly against the bias of the spring 18e, which action would, of course, result in disengagement of the pawls from the ratchet teeth. This action is, however, resisted by reason of the fact that, as long as member 18a is driving disk 18c, the friction between the ratchet teeth and the ends of the pawls 18d will overcome the tendency of centrifugal force to disengage the pawls. However, after combustion is initiated and the turbine 3 begins developing power, while at the same time the starting motor reaches its maximum speed condition, the torque applied by the driving rotor 18a to the driven motor 18c progressively decreases, and finally the energy developed by the turbine is sufficient to cause the rotor 9 to "over-run" the driving motor. It will be apparent that as soon as the driven member 18c moves counterclockwise relative to the driving member 18a, or whenever the torque applied by rotor 18a to the driven member 18c decreases to such an extent that friction between ratchet teeth 18b and pawl 18d is no longer adequate to overcome centrifugal force, the pawls 18d will fly outward so as to be completely disengaged from the driving member 18a, and will be retained in such position during normal operation. Thus there is no wear on the clutch parts in normal running. The point at which the clutch 18 disengages is represented by the sharp "knee" where the ascending speed curve 29a joins the maximum speed curve 29b (Fig. 3).

As indicated by curve 30 in Fig. 3, further rotation of the fuel control lever 15 causes the speed of rotor 9 to rise to the "idling" value represented by the curve 30a. This idling speed may be on the order of 5400 R. P. M. and, as indicated above, this speed is substantially above the maximum speed of the starting motor 16. The design of the pressure switch 25 is such that it causes the contacts 25e to open at this idling speed; therefore, the curve 25e in Fig. 3 shows that the pressure switch opens at the moment the speed of rotor 9 reaches the idling condition. Opening of these contacts breaks the circuit to the starting motor, with the result that starting motor speed falls along the dotted curve 29c in Fig. 3. It will be understood that the starting motor controller handle 20 remains in the "run" position so as to bridge the contacts 28, as indicated by the solid curve 29b.

The powerplant is now in normal operation at "idling" speed, which is that speed required to just maintain the gas turbine plant on a self-supporting basis, but without delivery of any net useful output. If the fuel control handle 15 is now moved from the "idling" position towards the "full load" position, the additional fuel supplied will result in the delivery of net output power through the shaft portion 9a. It may also be noted that, in some gas turbine powerplants, the speed at idling condition may be equal to the full normal rated speed. In other words, the curve 30a in Fig. 3 would then represent full rated speed, maintained constant by a speed governing device (not shown) on regulator 13, so that further increase in the fuel supply changes the net energy output of the powerplant delivered to the load while the fuel regulator 13 maintains rotational speed constant. The broken curve 30b in Fig. 3 represents the normal operation of the powerplant, in which the control lever 15 causes the fuel supply to vary between the "idle" and "full load" conditions.

In shutting down the powerplant, the operation is as follows. The fuel regulator handle 15 is moved to the "off" position, so that the fuel supply to nozzles 10 is discontinued, as represented by the falling curve 30c in Fig. 3. As soon as the fuel is discontinued, the flame is extinguished in combustors 2a and rotor speed begins to drop, with the result that the pressure switch contacts 25e are permitted to reclose, as indicated by curve 25e in Fig. 3. Since the starting motor controller 20 is still in the "run" position, the closing of contacts 25e causes the starting motor controller 21 to energize the motor 16 so that it again brings the powerplant rotor up to the maximum speed of the starting motor, this restarting of the motor 16 being indicated by the dotted curve 29d of Fig. 3. Since no fuel is being supplied to the powerplant, motor 16 will bring the shaft 9 only up to the maximum speed of motor 16 (curve 29e), which, as indicated above, is not sufficient to cause pressure switch 25e to open. Air drawn in from the atmosphere is pumped by the compressor 1 through the regenerator, combustion system, turbine and exhaust casing, so as to remove the stored heat therefrom. This positive flow of air also resists any tendency there might be for the wind to blow back through the exhaust casing and carry heat back to the compressor. As the heat is removed, the bimetallic strip 27b straightens out, and contacts 27a again close. This completes the circuit to the thermal relay solenoid 26f, with the result that latch 26d is withdrawn and spring 26c moves the contact lever 26a so as to open the contacts 26b. This again de-energizes the starting motor 16, the speed of which drops along the curve 29f in Fig. 3.

Since the maximum speed of the starting motor is below that required to actuate the pressure switch 25, the starting motor will run continuously during the cooling cycle without interference from the pressure switch 25.

If it is desired that the rotor coast to a standstill before the starting motor is re-energized, suitable time delay mechanism may be associated with the pressure switch relay 25. For purpose of illustration, this is represented in Fig. 1 as an orifice 25f in the pressure sensing conduit 25c. In starting, the compressor discharge pressure rises slowly so the orifice will have no appreciable effect on the operation of the relay 25. However, upon shut-down, the orifice will tend to maintain the pressure in bellows 25a, so the contacts 25e do not close immediately. By proper design, the time delay thus introduced may be made sufficient to permit the rotor to come to rest before the motor 16 is again started.

After the starting motor has been stopped by the thermal relay 26, it is necessary, before trying to restart the powerplant, to manually reset the push-button on lever 26a to close the contacts 26b and re-engage the latch 26d. In this connection it may be noted that the motor controller handle 20 must be returned to the "off" position before relay 26 will remain reset, since as long as lever 20 is in the "run" position the latch 26d will be retracted by solenoid 26f with the result that lever 26a cannot be reset. This arrangement insures that the motor controller handle 20 is in the "off" position and that the thermal relay 26 is properly reset before the starting cycle may be reinitiated.

It will be apparent that the invention thus provides a system for automatically re-energizing the starting motor in order to blow out the stored heat whenever the powerplant is shut down, so as to safeguard the compressor and other components against excessive temperatures resulting from this stored heat, as well as preventing deformation of the rotor during the cooling process.

While the system described above is only semiautomatic, having one manual controller for the starting motor and a second manual controller for the fuel system, it will be apparent to those skilled in the art that many modifications may be made. It will readily be seen that both controllers 15, 20 may be actuated in proper sequence by a common automatic timing arrangement so as to perform the above-described processes in the specified sequence. Also many substitutions may be made in the control components. For instance, the pressure switch 25 may in some cases be replaced by any device producing a signal as a function of the speed of the rotor shaft 9. This may take the form of a flyball operated or other centrifugal speed switch, or in electric "tachometer generator" producing a voltage signal proportional to shaft speed. Likewise the thermal switch 27 may be replaced by any suitable thermocouple or equivalent device capable of producing a signal proportional to the temperature of the regenerator or other principal parts which store substantial amounts of heat. Thus the thermal device may be a thermocouple actuated relay responsive to the temperature of the regenerator directly, or to the turbine temperature or that in the turbine exhaust casing. The thermal relay itself could, of course, take many other forms which will readily occur to those skilled in the art.

A more complex gas turbine powerplant embodying the invention and incorporating some of the modifications suggested above is illustrated diagrammatically in Fig. 4. The cycle of operation of this powerplant is shown in Fig. 5.

This powerplant comprises a low-pressure compressor 31 which takes in air from the ambient atmosphere through an inlet 31a and discharges through a conduit 32 containing an intercooler 33, thence through a high-pressure compressor 34 communicating by conduit 35 with a regenerator 36, which supplies heated and compressed air through the conduit 37 to an annular manifold 38 delivering air to the respective combustors 39. At least some of these combustors are provided with an igniting device represented by the spark or glow plug 40; and in the present instance one combustor is also provided with a "thermal reset switch" 41, the structure and function of which will be described more particularly hereinafter. The combustors furnish hot motive fluid to a two-stage turbine 42 comprising a first-stage rotor 42a directly coupled to drive the high-pressure compressor 34, and a second mechanically independent rotor 42b directly coupled to the low-pressure compressor 31. Spent motive fluid from the turbine is discharged through an exhaust casing 43 containing a temperature responsive device indicated diagrammatically as being a thermocouple 44. This spent motive fluid flows through the regenerator 36, where some of its remaining heat is transferred to the combustion air, after which the exhaust fluid is discharged through a conduit 45.

With this arrangement, the second-stage turbine 42b serves only to drive the low-pressure compressor 31, and the net power output is delivered through a shaft 34a by the first turbine rotor 42a. This load is represented as being a generator 46 connected by a suitable speed reduction gear 47 to the power output shaft 34a.

The fuel system for the powerplant comprises a suitable pump 48 supplying a fluid fuel through conduit 48c to an annular manifold 48d having branch conduits 48e communicating with the respective fuel spray nozzles 49, of which there is one in each combustor 39.

For starting this complex powerplant, a plurality of auxiliary prime movers is required. First there is a "turning gear motor" illustrated diagrammatically at 50 as being a suitable electric motor connected through a clutch 51 to a pinion 52 adapted to drive the generator gear 53.

A high-pressure starting motor 54 is connected through a clutch 55 to a pinion 56 meshing with the drive gear 34b. The shaft of pinion 56 is also arranged to drive the fuel pump shaft 48a by means of suitable gears 48b.

A third starting motor is shown at 57, connected through a clutch 58 to the rotor of the low-pressure compressor 31.

The control system, to which the present invention particularly relates, includes a main controller member represented as the rotary shaft 59 adapted to be driven clockwise by a sequence control timing motor 60. This motor is actuated in accordance with a manual controller 61 having a push-button 61a adapted to cause the timing motor 60 to drive the shaft 59 clockwise from its "start" position to the "idle" position, and a second "stop" button 61b which causes the control shaft 59 to rotate clockwise from the "stop" position back to the "start" position.

Shaft 59 is arranged to position a number of control components as follows. The "thermal reset contactor" 62 comprises a contact segment 62a connected to rotate with shaft 59 to the bridge contacts 62b so as to complete the circuit to the thermal reset switch 41 shortly after the ignition plugs are energized and to complete the circuit across contacts 62b throughout acceleration and normal operation, when there is to be flame in the combustors.

The turning gear motor controller 63 is connected by electrical leads 63a with the turning gear motor 50 and is adapted to energize this motor in accordance with the sequence of operations described below. Likewise the high-pressure starting motor controller 64 is connected by electrical leads 64a with the high-pressure starting motor 54. This circuit incorporates a thermal shut-off relay 65 comprising a holding solenoid 65j adapted to attract an armature 65k so as to close the contacts 65e, which are in series with the high-pressure starting motor controller 64 and the speed switch contacts 66c. The thermal shut-off switch 65a is arranged to energize the control circuit 65h for the solenoid 65j. Switch 65a consists of a cam 65b mounted to rotate with the shaft 59. This cam is so shaped that initial clockwise rotation of shaft 59 from the "start" position immediately causes the cam to engage contact arm 65c and close the contacts 65f against the bias of spring 65d. This energizes the solenoid 65j and closes the contacts 65e, thus completing the circuit from the starting motor controller 64 to the starting motor 54.

Serving the same function as the pressure switch 25 in Fig. 1 is a "speed switch" 66 comprising a contact arm 66a biased by a spring 66b to close the contacts 66c at all times except when retracted by a solenoid 66d, which is energized by a "tachometer generator" 67 coupled to the shaft of generator 46. It will be appreciated by those skilled in the art that the tachometer generator 67 and the circuit 67a connecting it with the solenoid 66d are so arranged that the solenoid retracts the contact arm 66a when the speed of generator 46 reaches a preselected value, and releases the arm 66a whenever the speed drops below this value.

The low-pressure starting motor controller 68 is connected by leads 68a with the low-pressure starting motor 57. This controller may be arranged to positively energize and de-energize the starting motor 57 in accordance with the program illustrated diagrammatically in Fig. 5; or alternatively the circuit 68a may include a speed switch similar to relay 66 and having a solenoid arranged to be energized by tachometer generator 67 in parallel with the solenoid 66d, so that both starting motors 54 and 57 are de-energized in accordance with the speed signal from tachometer generator 67.

The means for controlling the supply of fuel to the spray nozzles 49 is illustrated diagrammatically as being a fuel regulator 69, the details of which need not be described here, except to note that this regulator may be any suitable automatic or semi-automatic device of the general type represented by that disclosed in the above-mentioned application of Starkey, Lewis, and Edwards. It will be appreciated by those skilled in the art that, during normal running, this regulator controls the supply of fuel in accordance with the load output required of the generator 46.

The igniting device 40 is energized at the proper time in the cycle by an ignition controller 70 connected to the spark plug by leads 70a.

To guard against the contingency that combustion is not properly initiated by the igniting device 40, means are provided for causing the control system to begin the starting cycle all over in the event burning is not initiated in the combustors 39 promptly after the igniting device is energized. This arrangement comprises the thermal reset switch 41, which includes a fluid-filled bulb 41a subjected to the hot gases inside the combustion space and connected by capillary tube 41b to an expansible bellows 41c arranged to actuate a contact arm 41d so as to open the circuit at the contacts 41e whenever there is flame in the combustion space. This thermal reset switch 41 is in circuit with a thermal reset solenoid 71, which is adapted to automatically actuate the starting mechanism of the manual control 61 whenever the thermal reset contactor segment 62a bridges the contacts 62b and the thermal reset switch arm 41d bridges the contacts 41e. In this connection it is to be noted that the manual push-button controller 61 is adapted to immediately return the shaft 59 counterclockwise to its initial position, to repeat the starting sequence, whenever the "start" button 61a is actuated. Thus the starting cycle described below is begun anew whenever the button 61a is actuated manually, or automatically by solenoid 71. Thus the starting cycle is repeated whenever ignition fails to occur or when combustion accidentally ceases for any reason.

It should be observed that clutches 51, 55, and 58 are all of the overrunning type represented in Fig. 2.

Having described generally the various components of the controlling mechanism, the sequence of operations will be seen from a consideration of Fig. 5.

With the main controller member 59 in its initial or "start" position, the thermal reset contactor 62 is in open condition so that the circuit to the reset solenoid 71 is not completed, even though the thermal reset switch 41 is closed by reason of the low temperature in the combustion system. The thermal shut-off relay 65 is in open condition, described above in connection with Fig. 1, and the speed switch 66 is closed, since tachometer generator 67 is putting out no signal. The turning gear motor controller 63, low-pressure starting motor controller 68, fuel regulator 69, and ignition controller 70 are, of course, in the "off" condition.

To start the powerplant, the push-button 61a is depressed, causing the timing motor 60 to rotate shaft 59 clockwise away from the "start" position. This motion first causes the thermal reset cam 65b to close contacts 65f so as to energize solenoid 65j and complete the circuit between the high-pressure starting motor controller 64 and the motor 54. Simultaneously the turning gear motor controller 63 energizes the motor 50. The function of this motor, with its very high gear ratio to the generator drive gear 53, is to "break the rotors loose" in their bearings, extremely high starting torque being required to overcome the static friction in the large journal bearings required in the high-pressure compressor 34, generator 46, and the first-stage turbine rotor 42a. The motor 50 may, for instance, be adapted to rotate the shaft 34a at a speed on the order of 2 R. P. M.

Next the high-pressure starting motor controller 64 energizes the motor 54 through the closed thermal shut-off relay 65 and speed switch 66. This may take place at the same time, or slightly before, the turning gear motor 50 is de-energized by the controller 63. Through the use of the smaller turning gear motor with its much higher gear ratio, the high-pressure starting motor 54 may be of a comparatively smaller size than would be required if it were used to "break the rotors loose" in their bearings. The capacity of the high-pressure starting motor 54 is so selected that it is just capable of rotating the high-pressure compressor rotor at firing speed, which may be on the order of 10% of full rated speed, which means that this will be the maximum speed when motor 54 is driving through the clutch 55, with no help from the turning gear motor 50 or the first-stage turbine rotor 42a. It will be appreciated that, if the high-pressure starting motor 54 is energized slightly before the turning gear motor 50 is de-energized, motor 54 will bring the speed up according to the curve 72 in Fig. 5, with the result that the turning gear pinion 52 will "over-run" the turning gear motor 50 and the unidirectional clutch 51 will disengage. After this, the turning gear motor 50 will continue to run at its synchronous no-load speed until de-energized by the controler 63.

Since it is dangerous to attempt to restart a gas turbine powerplant as long as there are explosive gases in the combustion system, turbine, and exhaust piping, the motor controller 64 is arranged to keep the high-pressure starting motor 54 energized for a substantial length of time represented by the horizontal portion 73 of the speed curve in Fig. 5. This operation may continue for about four minutes and constitutes a "purging cycle," during which the high-pressure compressor is rotated at sufficient speed to draw air through the low-pressure compressor and related piping and blow it through the regenerator, combustion system, turbine, and exhaust piping so as to expel any fuel-air mixture which may remain from previous operating cycles. After this purging cycle, the ignition plugs 40 are energized by the controller 70, and simultaneously the fuel regulator 69 is positioned to begin supplying fuel at an increasing rate to the nozzles 49. This progressively increasing supply of fuel is indicated by the ascending curve 74 in Fig. 5.

At the instant the fuel supply begins, the ignition controller 70 energizes the plug 40 and combustion begins, unless some abnormal condition prevents the initiation of flame. If combustion does begin properly, the thermal reset switch 41 is caused to open promptly by the fluid in bulb 41a causing expansion of bellows 41c. Further rotation of main control shaft 59 causes the ignition controller 70 to de-energize the plug 40, at the same time moving the thermal reset contactor 62 to the closed position. It will now be apparent that, if the thermal reset switch 41 has not been opened by reason of the initiation of flame in the combustion system, the bridging of the contacts 62b by the contactor arm 62a will complete the circuit to the restart solenoid 71, which then actuates the starting button 61a. Thus shaft 59 is quickly returned counterclockwise to its initial position, and the timing motor 60 again begins driving shaft 59 clockwise so that the complete starting cycle described so far is repeated. In the case of such a "false start," the purging cycle 73 is of particular importance since there would almost certainly be an explosion if the spark plugs 40 were re-energized without first clearing the system of the explosive mixture resulting from the first starting cycle. It will be apparent that in normal operation the thermal reset switch 41 opens before the thermal reset contactor 62 closes, with the result that the restart solenoid 71 is not energized.

As fuel supply is increased according to the curve 74, the turbine 42a begins to assist in driving the high-pressure compressor 34 and the generator 46. However, the thermodynamic cycle of the powerplant is not yet "self-supporting," which means that the high-pressure starting motor 64 is still supplying torque to the pinion 56, with the result that clutch 55 remains engaged, as described above in connection with the clutch 13 in Fig. 1. The additional torque supplied by the first-stage turbine rotor 42a produces acceleration of the high-pressure compressor rotor as indicated by the ascending speed curve 75 in Fig. 5.

The hot motive fluid discharged from the first-stage turbine 42a now, of course, begins to supply energy to the second-stage rotor 42b. The function of the low-pressure starting motor 57 is to assist in bringing the low-pressure compressor speed up more rapidly to its normal rated condition. To this end, the low-pressure starting motor controller 68 energizes motor 57 shortly after combustion is initiated. It will be understood that motor 57 continues to supply torque to the low-pressure compressor rotor until such time as the second-stage turbine wheel 42b disengages clutch 58 by causing the low-pressure compressor rotor to "over-run" the low-pressure starting motor 57, or until the low-pressure controller 68 de-energizes motor 57. If the clutch 58 should disengage before motor 57 is de-energized, the motor will simply operate at its synchronous speed until the controller 68 does shut it down.

It may be noted that the raised "dwell" of cam 65b is of such a length that the thermal shut-off contacts 65f are positively held closed until after the ignition plugs are energized and combustion begins. The hot gases then cause the thermocouple 44 to put out an increasing signal which is multiplied in the amplifier 44a. This signal causes the holding solenoid 65g to maintain contact arm 65c in the closed position. Thus as long as the powerplant is hot, the thermocouple 44 acts to keep solenoid 65g energized and the contacts 65e closed. During normal running operation, the circuit to the starting motor 54 will be opened by the operation of the speed switch 66, as noted below. During normal operation and during the stopping cycle, the cam 65b is disengaged from the contact arm 65c so that the contacts 65f will be opened by spring 65d, whenever the temperature signal from the thermocouple 44 decreases sufficiently to indicate that the temperature level of the powerplant is down to a safe value.

With further increase in the fuel supply, the rotor speed of the generator 46 increases until tachometer generator 67 produces a signal voltage adequate to energize solenoid 66d and open the speed switch contacts 66c. This causes the high pressure starting motor 54 to be shut down. In order to make sure that the high-pressure starting motor will remain energized as long as it is still needed to supply torque to the pinion 56, the speed switch 66 is so arranged that it does not open until after the clutch 55 disengages by reason of the first-stage turbine rotor over-running the high-pressure starting motor. The point at which clutch 55 disengages is indicated by the sharp knee in the curve 75 in Fig. 5. After this point, the motor 54 continues to run at its synchronous speed until de-energized by opening of the speed switch 66. This synchronous running is represented by the level part 76 of the curve in Fig. 5. When the speed switch 66 de-energizes motor 54, its speed drops along the curve 77.

Continued rotation of the control shaft 59 causes the fuel regulator to bring the powerplant up to "idling" speed, represented by the horizontal portion of the curve 78 in Fig. 5. When shaft 59 reaches the "idle" position, sequence motor 60 automatically stops. Thereafter, normal operation of the powerplant at loads varying from idle to full, as dictated by the fuel regulator 69, is indicated by the broken curve 79.

The stopping cycle of the powerplant is as follows. When the "stop" button 61b of the manual control 61 is actuated, the timing sequence motor 60 begins to drive the shaft 59 clockwise through the remaining portion of its revolution, as shown on the indicator dial 59a in Fig. 4. This immediately causes the fuel regulator 69 to cut off the supply of fuel entirely, with the result that the fuel supply falls to zero, as indicated by the curve 80. Simultaneously, the decreased signal from the tachometer generator 67 causes the solenoid 66d to release the contact arm 66a so that the contacts 66c are closed to again complete the circuit from the high-pressure starting motor controller 64 to the motor 54. Continued rotation of shaft 59 now causes the high-pressure starting motor controller 64 to accelerate the starting motor 54, as indicated by the ascending curve 81 in Fig. 5. Since no fuel is supplied and the ignition plugs are not energized in this portion of the cycle, the motor 54 accelerates to the maximum speed at which it is capable of driving the high-pressure compressor 34. This maximum speed of which the starting motor 54 is capable when driving the compressor 34 without aid from the turbine is represented by the horizontal curve 82 in Fig. 5. Since this is considerably below the idling speed, at which the speed switch 66 opens the starting motor circuit, the motor 54 will continue to drive the compressor 34, as indicated by the curve 82.

Continuing rotation of compressor 34 by the high-pressure starting motor 54 pumps air through the entire powerplant and carries away the stored heat in the regenerator, turbine, combustion system, etc. Rotation of the compressor and turbine rotor during this cooling process also insures that the rotors will cool evenly.

As the temperature of the powerplant falls, the output of thermocouple 44 decreases until ultimately it is insufficient to enable the solenoid 65g to hold contacts 65f closed. The result is that spring 65d opens the contacts 65f, thus breaking the circuit to the holding solenoid 65j. Contacts 65e now open, thus breaking the circuit to the starting motor 54, the speed of which falls along the curve 83 in Fig. 5.

This purging and cooling cycle may be somewhat shorter than the total time required for the sequence motor 60 to return shaft 59 to the "start" position. It will, of course, be appreciated by those skilled in the art that the thermal shut-off relay 65 and the thermal shut-off switch 65a and the associated thermocouple 44 could be dispensed with and the sequence controller motor 60 be employed to return the high-pressure starting motor controller 64 to the "off" condition when shaft 59 returns to the "start" position. It is, of course, more economical of the electric power consumed to have a thermal device shut down the starting motor as soon as the temperature of the powerplant decreases to a safe value. In any event, the timing motor 60 will return the shaft 59 to the "start" position and then automatically stop, ready for the next operating cycle.

Thus it will be seen that the control system of Fig. 4 performs in a more automatic fashion the same purging and cooling process described above in connection with Fig. 1. It will be appreciated, of course, that all the functions of the system of Fig. 4 might be performed by analogous manual operating devices.

In addition to the alternative components suggested above, many other changes and modifications will occur to those skilled in the art; and it is desired to cover by the appended claims all such changes as fall within the true spirit and scope of the invention.

What we claim as new and desire to secure by Letters Patent of the United States is:

1. In a regulating system for a gas turbine powerplant having an auxiliary prime mover connected to drive a compressor for furnishing air to the combustion system, the combination of means for automatically restarting the auxiliary prime mover to drive the compressor when the fuel supply to the combustion system is discontinued, and means for stopping the auxiliary prime mover in accordance with a temperature condition in the powerplant.

2. In a regulating system for an open cycle gas turbine powerplant having an auxiliary prime mover adapted to drive a compressor for furnishing air to the combustion system, the combination of means for automatically restarting the auxiliary prime mover to drive the compressor when the speed of the powerplant rotor drops below a preselected value when the powerplant is shut down, whereby air from the ambient atmosphere is pumped through the powerplant to carry away heat stored in the hot components thereof, and means responsive to a temperature condition in the powerplant for stopping the auxiliary prime mover when the stored heat has been substantially removed.

3. In a regulating system for an open cycle gas turbine powerplant having at least one turbine-compressor and an auxiliary starting motor adapted to bring the compressor rotor up to firing speed during the starting cycle, the combination of means for automatically restarting the motor for driving the compressor rotor when the fuel supply to the combustion system is discontinued, whereby cool air from the ambient atmosphere is pumped through the powerplant to carry away heat stored therein, and means for stopping the motor when the temperature of the powerplant is reduced to a preselected value.

4. In a regulating system for an open cycle gas turbine powerplant having at least one turbine-compressor and an auxiliary starting motor connected to bring the compressor rotor up to firing speed during the starting cycle, the combination of means for automatically restarting the motor to drive the compressor rotor when the speed thereof falls below the firing speed when the powerplant is shut down, whereby air from the ambient atmosphere is pumped through the powerplant to remove heat stored therein, and means for automatically disconnecting the starting motor when the temperature of a hot component of the powerplant is reduced to a preselected value.

5. In a regulating system for an open cycle gas turbine powerplant having at least one turbine-driven compressor, a heat exchanger having substantial heat storage capacity, and an auxiliary starting motor adapted to bring the turbine-compressor rotor up to firing speed during the starting cycle, the combination of means responsive to rotor speed for automatically de-energizing the motor at the completion of the starting cycle, means for automatically restarting the motor to drive the turbine-compressor rotor when the speed thereof falls below a preselected value, whereby air is pumped through the powerplant to remove heat stored in the heat exchanger, and means responsive to the temperature of said cooling air for automatically stopping the motor when the stored heat is substantially removed from the heat exchanger.

6. In a regulating system for a gas turbine powerplant having at least one turbine-driven compressor, a heat exchanger having substantial heat storage capacity, and an auxiliary prime mover adapted to bring the compressor rotor up to firing speed during the starting cycle, the combination of means for automatically disconnecting the auxiliary prime mover at the completion of the starting cycle, means for automatically restarting said prime mover to drive the compressor rotor when the powerplant is shut down, whereby air is pumped through the powerplant to remove heat stored in the heat exchanger, and means responsive to a temperature condition in the powerplant for automatically disconnecting the prime mover when the stored heat is substantially removed from the exchanger.

7. In a regulating system for an open cycle gas turbine powerplant having at least one turbine-compressor, a combustion system with means for supplying fuel thereto, and an auxiliary starting motor adapted to bring the compressor rotor up to firing speed during the starting cycle, the combination of means for disconnecting the starting motor when the speed of the compressor rotor rises to a preselected value above firing speed, means for automatically reconnecting the starting motor to drive the compressor rotor when the speed thereof drops below said preselected value, whereby air is pumped through the powerplant to carry away heat stored therein when the supply of fuel to the combustion system is discontinued, and means for automatically disconnecting the starting motor when said stored heat is substantially removed.

8. In a regulating system for an open cycle gas turbine powerplant having at least one turbine-compressor and a combustion system with means for supplying fuel thereto and an auxiliary starting motor adapted to bring the compressor rotor up to firing speed during the starting cycle, the combination of means for disconnecting the starting motor when the discharge pressure of the compressor rises to a preselected value, means for automatically reconnecting the starting motor to drive the compressor when the discharge pressure thereof drops substantially below said preselected value, whereby cool air from the ambient atmosphere is pumped through the powerplant to remove heat stored therein when the powerplant is shut down, and means for automatically discontinuing operation of the starting motor when said stored heat is substantially removed.

9. In a regulating system for an open cycle gas turbine powerplant having at least one turbine-compressor with a combustion system and means for delivering fuel thereto and a starting motor adapted to bring the compressor rotor up to firing speed during the starting cycle, the combination of means for automatically discontinuing operation of the starting motor when the speed of the turbine-compressor rotor rises to a preselected value, means for again connecting the starting motor to drive the turbine-compressor rotor when the speed thereof drops upon discontinuance of fuel supply to the combustion system, whereby comparatively cool air from the ambient atmosphere is pumped through the powerplant to purge residual fuel vapors and remove heat stored in the hot components of the powerplant, and means for automatically discontinuing operation of the starting motor when the temperature of said hot components is reduced to a preselected value.

10. In a regulating system for an open cycle gas turbine powerplant having an auxiliary prime mover adapted to drive a compressor for furnishing air to the combustion system, the combination of means for automatically restarting the auxiliary prime mover to drive the compressor when the supply of fuel to the combustion system is discontinued upon shut-down, whereby air from the ambient atmosphere is pumped through the powerplant to carry away heat stored in the hot components thereof, and means for automatically stopping the compressor when said stored heat has been substantially removed.

11. In a regulating system for a gas turbine powerplant having at least one turbine-compressor with a combustion system and means for delivering fuel thereto and an auxiliary prime mover adapted to be connected to bring the compressor rotor up to firing speed during the starting cycle, the combination of means for automatically disconnecting the auxiliary prime mover from the compressor when the speed of the turbine-compressor rotor rises to a preselected value during the starting cycle, means for automatically re-connecting the auxiliary prime mover to drive the compressor when the supply of fuel to the combustion system is discontinued upon shut-down, whereby comparatively cool air is pumped through the powerplant to remove heat stored in the hot components thereof, and means for automatically disconnecting the auxiliary prime mover when said stored heat is substantially removed.

GEORGE R. FUSNER.
CHAPMAN J. WALKER.

REFERENCES CITED

The following references are of record in the file of this patent:

UNITED STATES PATENTS

| Number | Name | Date |
| --- | --- | --- |
| 2,129,529 | Howard | Sept. 6, 1938 |
| 2,252,456 | Buehman | Aug. 12, 1941 |
| 2,443,648 | Austin et al. | June 22, 1948 |
| 2,538,179 | Weinhardt | Jan. 16, 1951 |